(12) United States Patent
Liu et al.

(10) Patent No.: US 7,608,332 B2
(45) Date of Patent: Oct. 27, 2009

(54) CATHODE MATERIAL PARTICLE COMPRISING OF PLURALITY OF CORES OF COATED GRAINS

(75) Inventors: Mao-Huang Liu, Taipei (TW); Jin-Ming Chen, Taoyuan (TW); Tzu-Hwa Cheng, Kaohsiung (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 12/287,851

(22) Filed: Oct. 10, 2008

(65) Prior Publication Data
US 2009/0050859 A1 Feb. 26, 2009

Related U.S. Application Data

(63) Continuation-in-part of application No. 10/866,840, filed on Jun. 14, 2004, now abandoned.

(51) Int. Cl.
*B32B 5/16* (2006.01)
*H01M 4/32* (2006.01)
*H01M 4/50* (2006.01)
*H01M 4/52* (2006.01)

(52) U.S. Cl. ............ 428/403; 429/128; 429/223; 429/224

(58) Field of Classification Search .......... 428/403; 429/128, 223, 224
See application file for complete search history.

(56) References Cited

U.S. PATENT DOCUMENTS

| | | | |
|---|---|---|---|
| 5,474,752 A | 12/1995 | Yamamoto | |
| 5,955,051 A | 9/1999 | Li et al. | |
| 5,985,488 A | 11/1999 | Mitate et al. | |
| 5,993,998 A | 11/1999 | Yasuda | |
| 6,033,807 A | 3/2000 | Yasuda | |
| 6,040,089 A | 3/2000 | Manev et al. | |
| 6,187,282 B1 | 2/2001 | Hattori et al. | |
| 6,207,325 B1 | 3/2001 | Matsui et al. | |
| 6,210,834 B1 | 4/2001 | Kweon et al. | |
| 6,218,052 B1 | 4/2001 | Wang | |
| 6,335,119 B1 | 1/2002 | Maruta | |
| 6,395,250 B2 | 5/2002 | Matsubara et al. | |
| 6,673,491 B2* | 1/2004 | Shirakawa et al. | 429/224 |
| 6,699,618 B2* | 3/2004 | Noda et al. | 429/224 |
| 6,733,923 B2 | 5/2004 | Yun et al. | |
| 6,921,609 B2 | 7/2005 | Lampe-Onnerud et al. | |
| 7,090,822 B2* | 8/2006 | Noda et al. | 423/594.15 |
| 7,235,193 B2 | 6/2007 | Park et al. | |
| 7,323,218 B2 | 1/2008 | Chen et al. | |
| 7,364,793 B2* | 4/2008 | Paulsen et al. | 428/402 |
| 7,374,841 B2* | 5/2008 | Hosoya et al. | 429/231.1 |
| 7,429,434 B2* | 9/2008 | Mihara et al. | 429/231.1 |
| 2003/0228464 A1 | 12/2003 | Spitler et al. | |
| 2006/0068289 A1 | 3/2006 | Paulsen et al. | |

OTHER PUBLICATIONS

"U.S. Appl. No. 10/866,840 Non-Final Office Action mailed May 1, 2008", OARN, 3 Pgs.

* cited by examiner

*Primary Examiner*—H. (Holly) T Le
(74) *Attorney, Agent, or Firm*—Schwegman, Lundberg & Woessner, P.A.

(57) ABSTRACT

A cathode material particle comprising a plurality of cathode material cores and each cathode material core having plurality of grains and each grain being uniformly covered with a nano-metal oxide layer, wherein a thickness of the nano-metal oxide layer is 1 nm to 100 nm. The cathode material has excellent safety (good thermal stability), high-capacity, good cycleability and high-rate charging or discharging capability.

17 Claims, 10 Drawing Sheets

CATHODE MATERIAL PARTICLE COMPRISING OF PLURALITY OF CORES OF COATED GRAINS

The present invention is a continuation-in-part application that claims the benefit of the parent application Ser. No. 10/866,840 filed Jun. 14, 2004 now abandoned.

BACKGROUND OF THE INVENTION

1. Field of the Invention

The invention relates to a cathode material particle, and more particularly a cathode material particle with a plurality of cores individually covered uniformly with a nano-metal oxide layer to improve the safety when used on a lithium battery.

2. Description of Related Art

High-capacity cathode material used on a lithium battery not only affects the battery characteristics, but also influences the safety of the lithium battery. In addition to the requirement the high-capacity, thermal stability is an important factor for the safety of the cathode material. The cathode material must be very safe when used on the lithium battery. A new cathode material is lithium-nickel oxide ($LiNiO_2$) that has high-capacity but is unsafe and poor cycleability. Therefore, the lithium-nickel oxide is difficult to use with lithium batteries presently. Another cathode material is lithium-manganese oxide ($LiMn_2O_4$) that is safe for lithium battery but only has a capacity of about 110 m-Ah/g (milliampere hour/gram) that is 40%-45% lower than the capacity of still another cathode material of lithium-cobalt-nickel oxide ($LiCoNiO_2$).

Lithium cobalt nickel oxide is a potential material for cathode material but has not been merchandised because the safety problem has not been resolved. To overcome the safety problem with lithium-cobalt-nickel oxide, metal ions such as aluminum or magnesium ions are doped into the lithium-cobalt-nickel oxide to improve the safety. However, the capacity of the cathode in the lithium batteries is reduced and internal resistance is increased so that the lithium batteries can not discharge and charge in high-rate. Alternately, a metal oxide layer can be coated on sintered lithium-cobalt-nickel oxide particles by secondary sintering. However, the thickness of the metal oxide layer is on the order of a micron that increases the surface resistance of the cathode and increases non-charging areas to the lithium-cobalt-nickel oxide. Therefore, the cathode material made of lithium-cobalt-nickel oxide with a micron metal oxide layer also has the problems of increasing internal resistance, decreasing capacity of high-rate discharge, etc.

With reference to FIG. 9, U.S. Pat. No. 6,733,923 disclosed a battery (20). The battery (20) has an aluminum (Al) foil (21), two electrodes (22) is and two porous oxide layers (24). Each electrode (22) comprises a plurality of particles (23). A thickness of the electrode (22) is about 50 μm to 10 μm. The porous oxide layers (24) are respectively covered on the electrodes (22). The porous oxide layers are just only coated on the surface of the electrode (50~100 μm), the coating layer will swell during electrode cycling test.

The present invention has arisen to provide a cathode material particle on the order of nanometer thickness to mitigate or obviate the drawbacks of conventional cathode material.

SUMMARY OF THE INVENTION

A main objective of the present invention is to provide a cathode material particle with a plurality of cores individually covered uniformly with a nano-metal oxide layer for batteries, which have excellent safety.

Further benefits and advantages of the present invention will become apparent after a careful reading of the detailed description in accordance with the drawings.

DETAILED DESCRIPTION OF THE PREFERRED EMBODIMENT

Figure 1A:
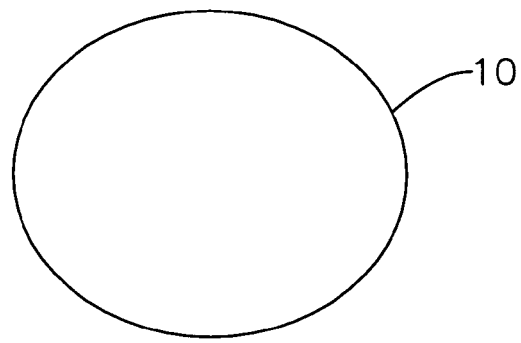
FIG. 1A is a side view of a cathode material particle in accordance with the present invention.
Figure 1B:
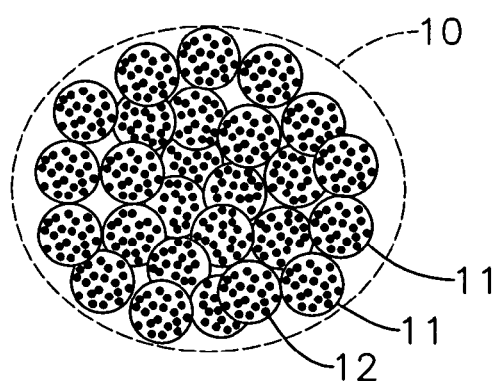
FIG. 1B is another side view of the cathode material particle in FIG. 1.
Figure 1C:
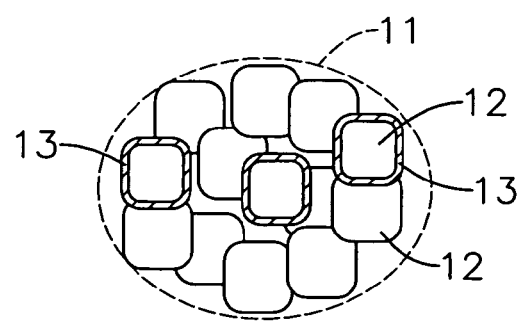
FIG. 1C is an enlarged cross sectional side view of a grain in the cathode material particle in FIG. 1.

With reference to FIGS. 1A to C and 7A to D, a cathode material particle (secondary particle) (10) has a plurality of cathode material cores (primary particles) (11). A particle size of the a cathode material particle (10) is about 1 μm to 20 μm. A particle size of a cathode material core (11) is about 100 nm to 2 μm. Each cathode material core (11) has a plurality of grains (12). A grain size is about 10 nm to 300 nm. Each grain (12) is uniformly covered with a nano-metal oxide layer (13). A thickness of the nano-metal oxide layer (13) is about 1 nm to 100 nm.

The prior art focuses on conductivity improvement of electrode (cathode pole). The present invention focuses on surface coating of the grain of the cathode material core with the nano-metal oxide layer, which improves the thermal and structural stability of material in battery.

A method for manufacturing the cathode material particle comprises a soaking process, a drying process and a sintering process.

In the soaking process, a cathode material precursor in a particle form serves as cathode material cores and the cathode material precursor is soaked in a surface improving agent containing metal salt or metal ions.

In the drying process, the surface improving agent is dried to deposit the metal ions or the metal salt on surfaces of the particles of the cathode material precursor.

In the sintering process, lithium hydroxide powder is mixed with the cathode material precursor and then transported into a sintering furnace to sinter at 700° C. to 850° C.

for 6 to 24 hours allowing lithium hydroxide to permeate into each cathode material precursor to develop crystalline grains inside and allowing the surface improving agent to form a nano-metal oxide layer on a surface of grain to obtain the cathode material particles. Thereby, the grains in the cathode material particles with the nano-metal oxide layers on the surface are achieved.

The cathode material precursor is cobalt-nickel hydroxides having the following formula: $Co_xNi_{1-x}(OH)$, $0<x<1$. The surface improving agent is a metal salt solution, and metal salt in contained in the metal salt solution is selected from the group consisting of magnesium hydroxide, strontium hydroxide, aluminum hydroxide, manganese nitrate, titanium chloride and gallium nitrate.

Example of Manufacturing Lithium-cobalt-nickel Oxide ($LiCoNiO_2$) Particles with Nano-metal Oxide Layers on the Surface in Accordance with the Present Invention Cobalt-nickel hydroxide of $Co_{0.2}Ni_{0.8}(OH)$ in particle form with particle diameters of 9 μm served as the precursor. The particles were poured into a surface improving agent of magnesium hydroxide ($Mg(OH)_2$) solution to soak. Then, the magnesium hydroxide solvent was heated to evaporate the water and deposit the magnesium hydroxide on surfaces of the cobalt-nickel hydroxide particles. Lithium hydroxide hydrate ($LiOH$—$H_2O$) powder was mixed with the cobalt-nickel hydroxide particles and transported into a sintering furnace to sinter at 750° C. for 16 hours. Thereby, lithium ions permeated into the precursor to develop crystalline grains inside and a magnesium oxide layer of 15 nm thickness was formed on surfaces of grains to achieve the cathode material particles. The proportion of metals in the cathode material particles was lithium:magnesium:cobalt:nickel=1.05:0.01:0.2:0.8 (mole ratio). Preferably, lithium content is in mole ratio of 1.00 to 1.05 and magnesium content is in mole ratio of 0.001 to 0.05 both in comparison with total metal content in the cathode material particles.

<Example of Manufacturing Conventional Lithium-cobalt-nickel Oxide ($LiCoNiO_2$) Particles without Metal Oxide Layers>

Cobalt-nickel hydroxide of $Co_{0.2}Ni_{0.8}(OH)$ in particle form of with particle diameter of 9 μm served as the precursor. The particles were mixed with lithium hydroxide hydrate ($LiOH$—$H_2O$) powder and transported into a sintering furnace to sinter at 750° C. for 16 hours to form lithium cobalt-nickel oxide particles. The proportion of metals in the conventional cathode material particles was lithium:cobalt:nickel=1.05:0.2:0.8 (mole ratio).

<Manufacturing Examples of Coin Cells>

The lithium cobalt-nickel oxide cathode material in the foregoing example was mixed with graphite and poly-vinyldiene fluoride (PVDF 1100) in weight proportion of 85:10:5 to compose a mixture. The mixture was further added to N-methylpyrrolidone (NMP) solvent to form slurry. The slurry was coated on a 20 μm aluminum foil by a 250 μm doctor blade to perform an electrode plate. Then, the electrode plate was lightened and dried with infrared light and transported into a vacuum system to remove the N-methylpyrrolidone solvent. Lastly, the electrode plate was compressed and punched into coin-shaped electrode pieces of 12 mm diameter. In a coin cell, the coin-shaped electrode piece was the cathode and a lithium piece was the anode. The electrolyte of the lithium battery is 1M LiPF6-EC+DEC (Ethylene Carbonate+Diethyl carbonate)(volume proportion=1:1). The coin cell was charged and discharged in 0.4 $mA/cm^2$ current density.

The conventional lithium-cobalt-nickel oxide particles were processed into coin-shaped electrode pieces in the same manner as above and then applied to a coin cell.

<Differential Scanning Calorimeter (DSC) Test of the Coin Cells>

The coin cell with lithium-cobalt-nickel oxide particles with nano-metal oxide layers in accordance with the present invention was charged to 4.2 volts. Then, the coin-shaped electrode piece was detached from the coin cell and then the cathode material was scratched from the coin-shaped electrode piece. 3 g of the cathode material was inputted into an aluminum can to mix with 3 μL electrolyte. The aluminum can was sealed and scanned with a temperature differential of 5° C./min within 150° C. to 300° C.

The coin cell with the conventional lithium-cobalt-nickel particles without metal oxide layers was tested in the same way as described above.

<Manufacturing Examples of $LiCoNiO_2$/MCMB Prismatic Batteries>

The standard size of a prismatic battery is 6.3×30×48 mm (width×length×height). The capacity of prismatic battery is about 650 mAh (maximum charge voltage was 4.2 and maximum discharge voltage was 2.8). The cathode material was the lithium-cobalt-nickel oxide particles with nano-metal oxide layers on the surface in the present invention. A conductive additive was KS-6 (purchased from Timcal Company). A binder applied at cathode was polyvinyldiene fluoride, (PVDF, kureha 1100). The weight proportion of the lithium-cobalt-nickel oxide particles, the conductive material and the binder at cathode was 85:10:5. The anode material was mesophase microbead (MCMB), and a binder applied at anode was polyvinyldiene fluoride (PVDF, kureha 1100). The weight proportion of the mesophase microbead to the binder at anode was 90:10.

The lithium-cobalt-nickel oxide particles, the conductive material, the cathode binder and NMP were mixed together to form a cathode slurry. Then, the cathode slurry coated on an aluminum foil substrate. The aluminum foil substrate with the cathode slurry was dried to form the cathode plate.

The mesophase microbead, the anode binder and NMP were mixed together to form an anode slurry. Then, the anode slurry coated on a copper foil substrate. The copper foil substrate with the anode slurry was dried to form the anode plate. The cathode and the anode plates were rolled into Jelly-roll electrode and bound with tape at the sides and bottoms. Then, the Jelly-rolls were canned with isolating sheets in a battery container and capped with covers to form the battery housing. The battery housing was subjected to a vacuum and then filled with electrolyte. After welding a safety vent on the battery housing and washing the battery housing, the prismatic battery was formed. The prismatic battery was subjected to a crushing safety test, in which the prismatic battery was charged to 4.2 voltage and pressed by a flat surface of a round stick (diameter of the flat surface was 25 mm) at 17.2 Mpa. The prismatic battery was also subjected to a drilling safety test, in which the prismatic battery was charged to 4.2 voltage and drilled by a drilling head of 2 mm diameter at 500 rpm.

The conventional lithium-cobalt-nickel oxide particles without nano-metal oxide layers on the surface were processed in the same way as described above to manufacture a conventional prismatic battery. The conventional prismatic battery was also tested for drilling safety and crushing safety.

CONCLUSION

Figure 2:
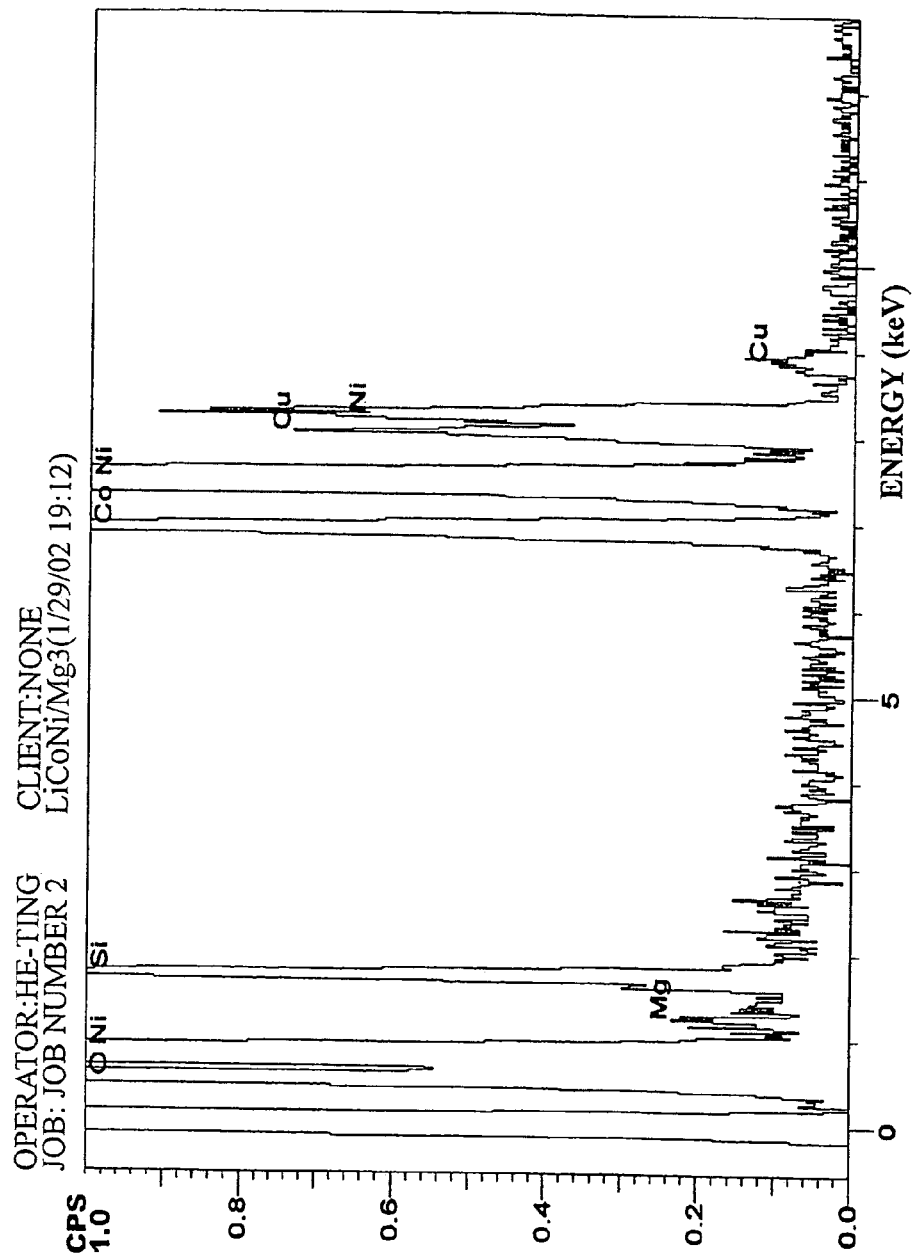
FIG. 2 is a testing diagram for element analysis of a nano-metal oxide layer in accordance with the present invention.
Figure 7A:
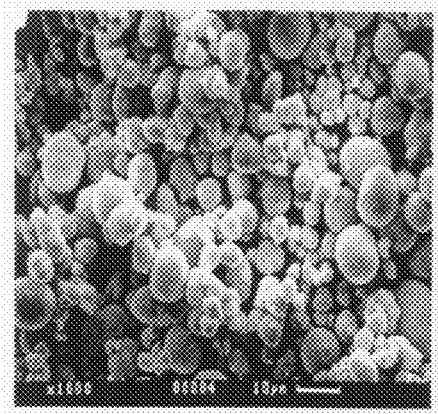
FIG. 7A is a scanning electron microscope (SEM) picture of a cathode material particle with cathode material cores in accordance with the present invention (amplified 1K times)
Figure 7B:
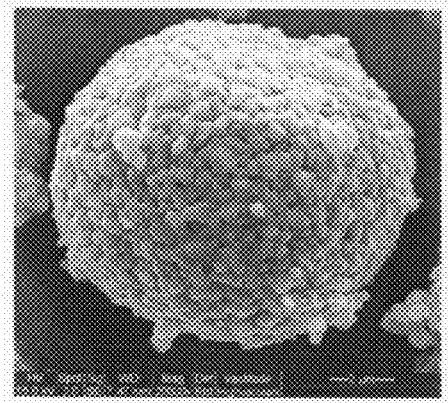
FIG. 7B is a SEM picture of a cathode material core with grains in the cathode material particle in FIG. 7A (amplified 20K times)
Figure 7C:
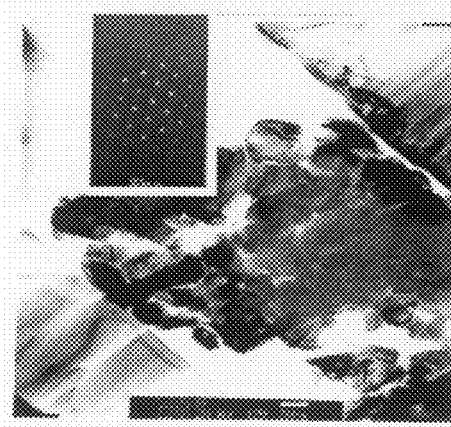
FIG. 7C is a transmission electron microscope (TEM) picture of a grain in the cathode material core in FIG. 7B (amplified 25K times)
Figure 7D:
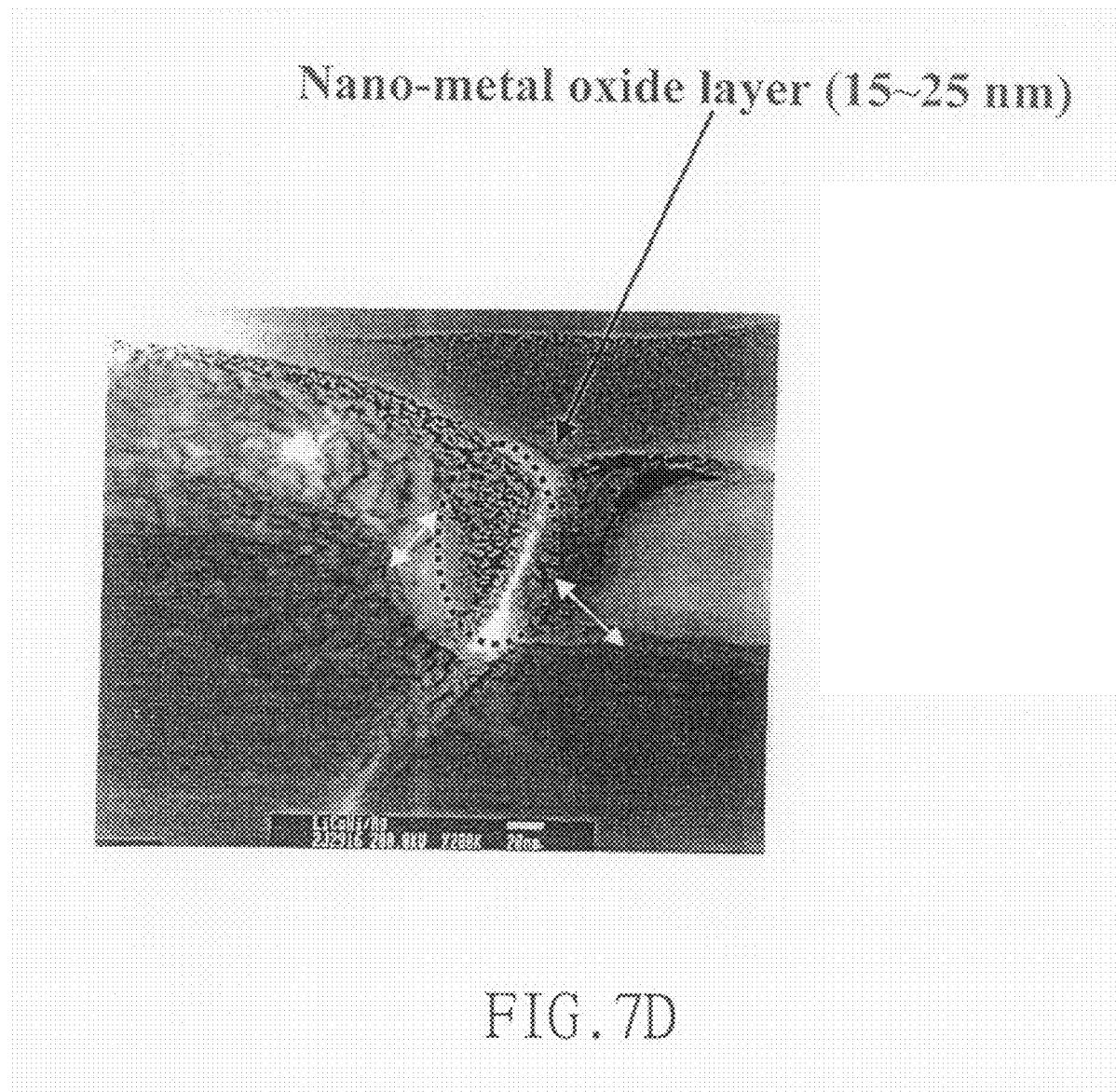
FIG. 7D is a TEM picture of the grain in FIG. 7C (amplified 200K times) to show a surface of the grain covered with a nano-metal oxide layer.
Figure 8:
FIG. 8 is a transmission electron microscope (TEM) picture of a conventional cathode material particle in accordance with the prior art.
Figure 9:
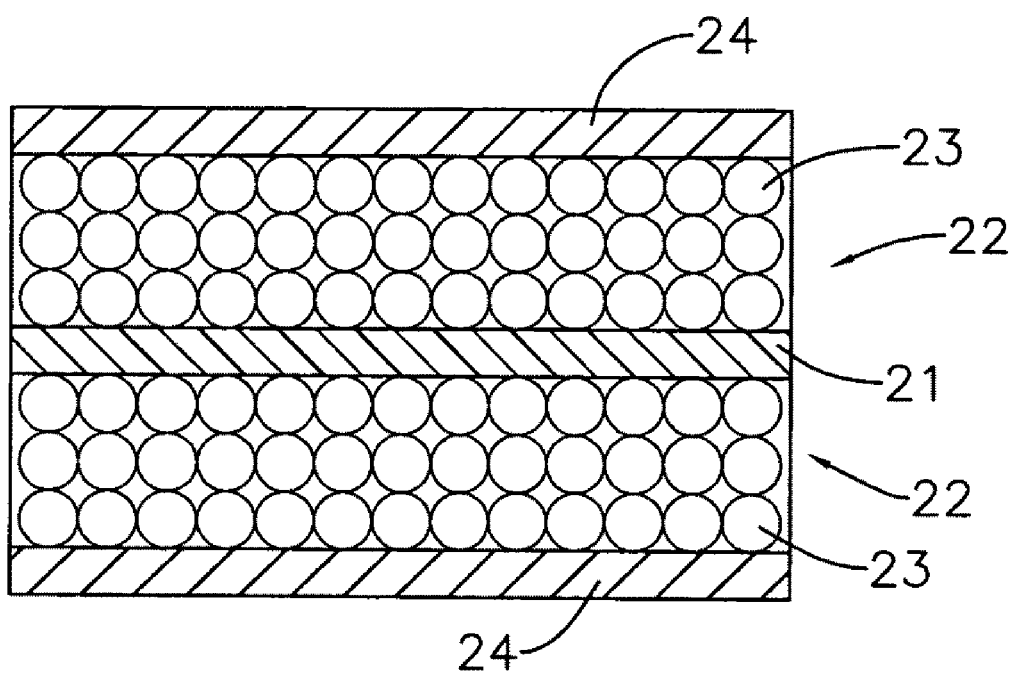
FIG. 9 is a side view in partially cross section of a conventional battery in accordance with the prior art.

FIG. 7A is the surface morphology of cathode material particles by scanning electron microscope (SEM). One single cathode material particle (FIG. 7B) comprises a plurality of cathode material cores (FIG. 7C) and each cathode material core has plurality of grains and each grain is uniformly covered with a nano-metal oxide layer (FIG. 7D), wherein the thickness of the nano-metal oxide layer is 15 nm to 25 nm. With reference to FIG. 7D, the nano-metal oxide layer was measured by transmission electron microscope (TEM). A metal oxide layer of 15 nm to 25 nm was observed on the surface of the cathode material particle. From the EDX analysis of TEM, the composition of the nano-metal oxide layer is magnesium oxide ($Mg_xO$) as shown in FIG. 2. With reference to FIG. 8, a conventional cathode material particle did not have the metal oxide layer on the surface.

Figure 3:
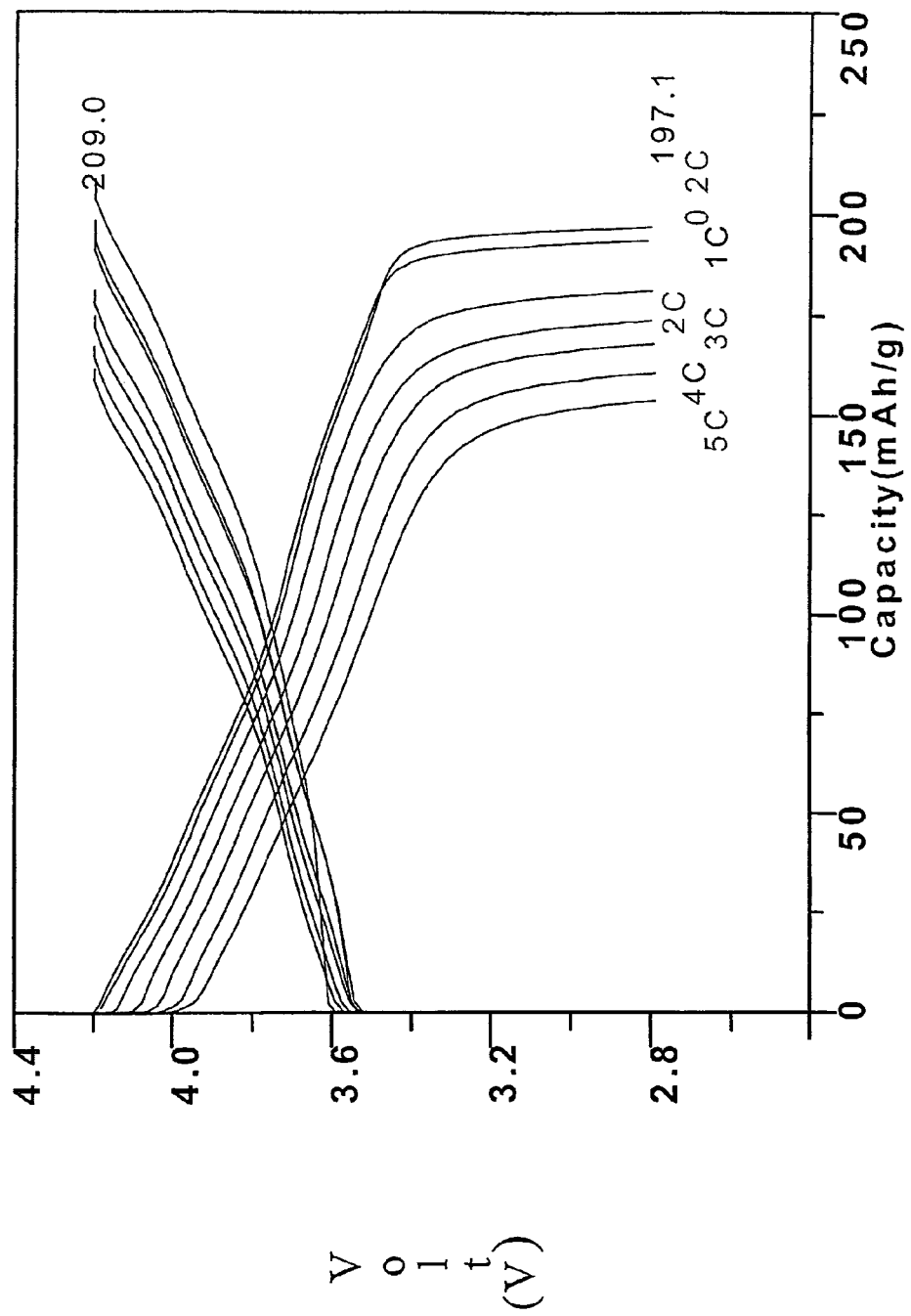
FIG. 3 is a testing diagram of coin cell made of the cathode material particle in accordance with the present invention to show relations between different discharging currents and capacities.

With reference to FIG. 3, when the coin cell made of the cathode material in the present invention was discharged at 0.1 C-rate, the capacity was 196 mAh/g, wherein the coin cell was charged to 4.2 voltage first. When the coin cell was discharged at 5 C-rate, the capacity was 155 mAh/g, wherein the coin cell was charged to 4.2 voltage first. The cathode material particles with nano-metal oxide layers on the surface still have discharging is capability for large currents when compared to conventional ones without nano-metal oxide layers.

Figure 4:
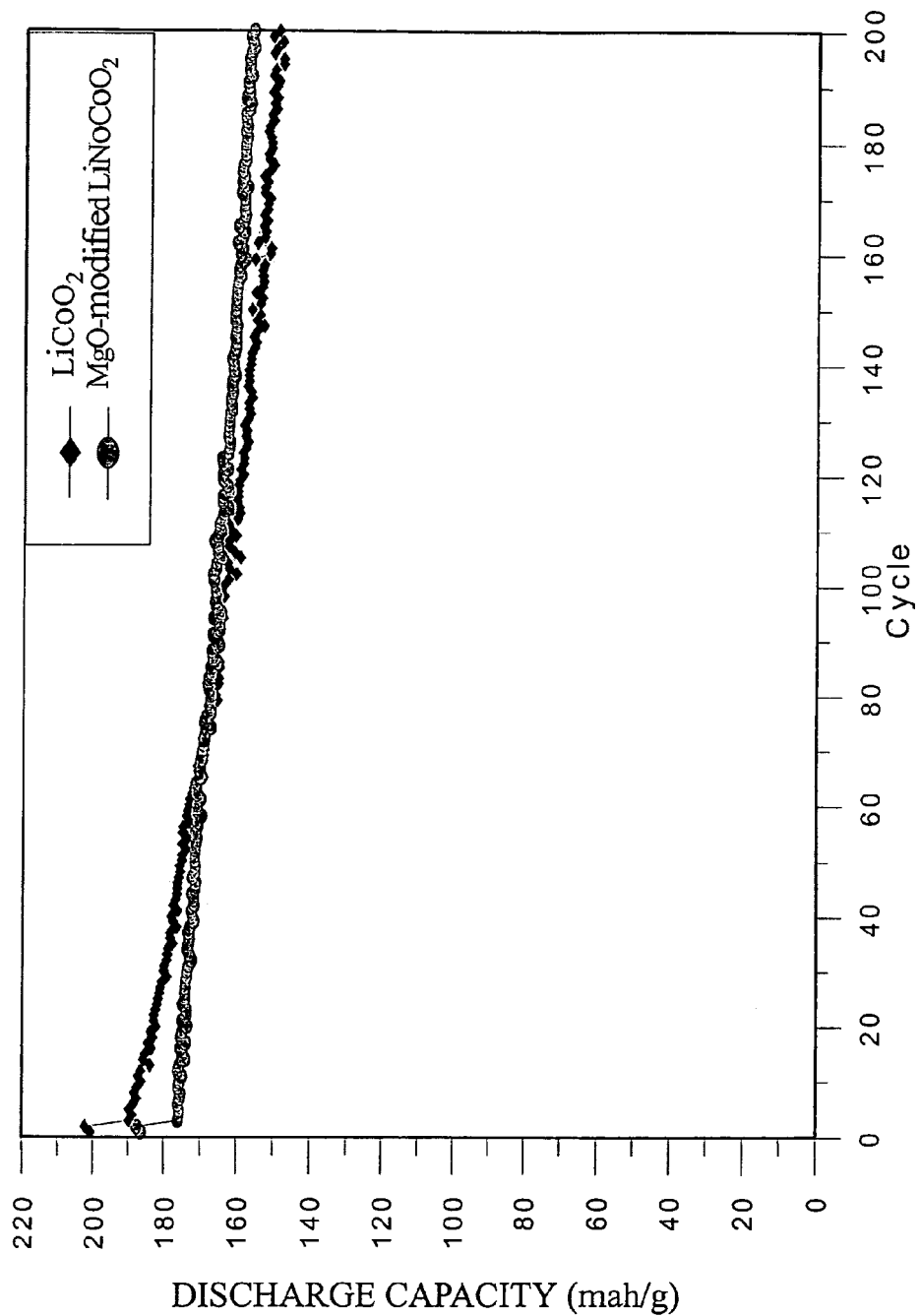
FIG. 4 is a comparison diagram in cycle life of coin cell.

With reference to FIG. 4, after 200 cycles of charging and discharging at 0.5 C-rate, the coin cell made of the cathode material particles in the present invention still had higher capacity than the one made of the conventional cathode material particles.

Figure 5:
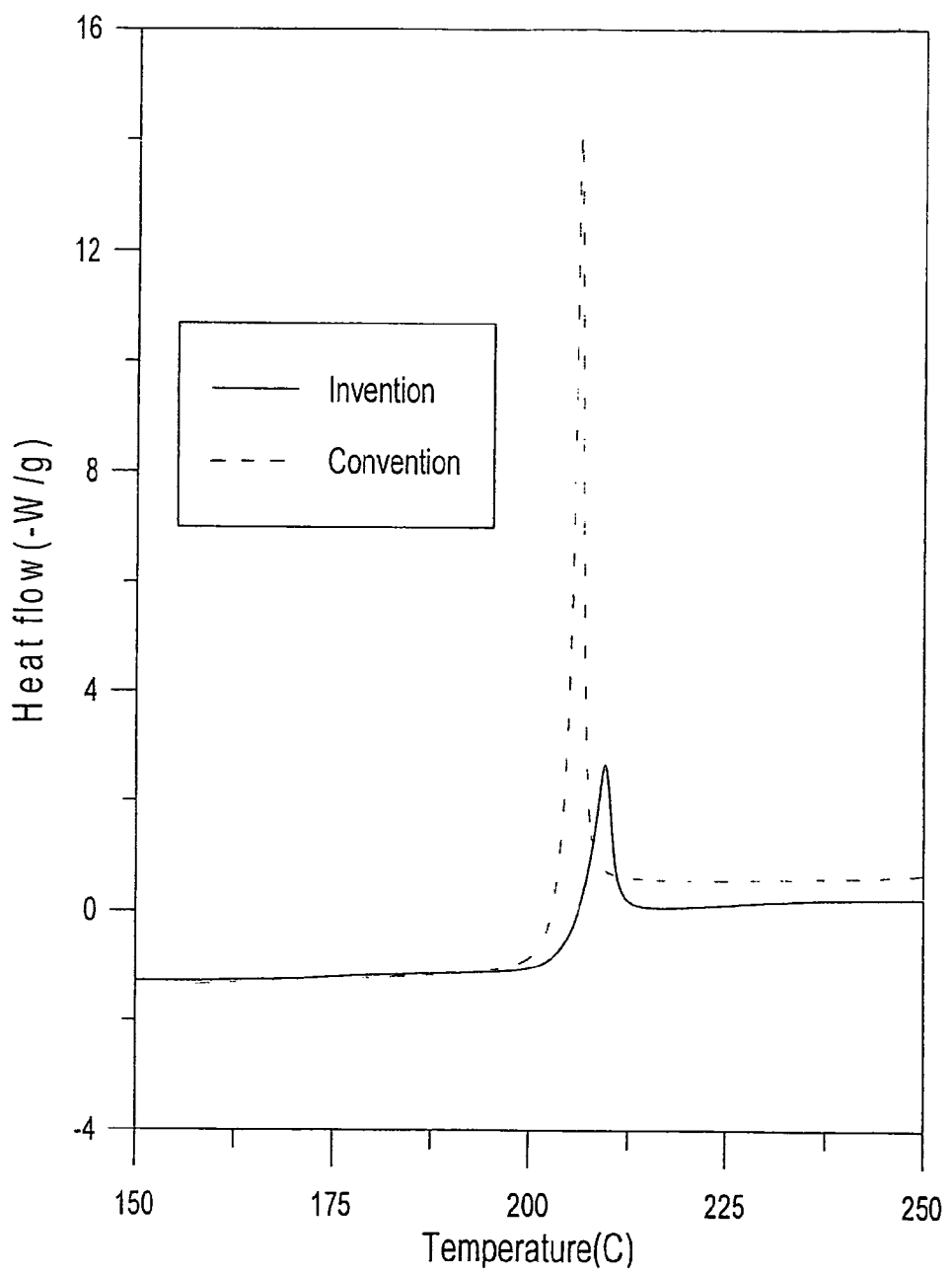
FIG. 5 is a comparison diagram tested by a differential scanning calorimeter with regard to released heat-flow of the material.

With reference to FIG. 5, the thermal analysis by a differential scanning calorimeter shows the heat-flows of the coin cell at different temperature segments. Additionally, the exothermic heat from the short batteries was an important factor for safety of the batteries. As shown in FIG. 5, it was observed by integrating the area of exothermic peaks that the coin cell of the conventional cathode material particles generated over 350 joule/g that was three times the exothermic heat from the coin cell of the present invention. Therefore, the cathode material particles with nano-metal oxide layers on the surface had the excellent property of safety.

Figure 6:
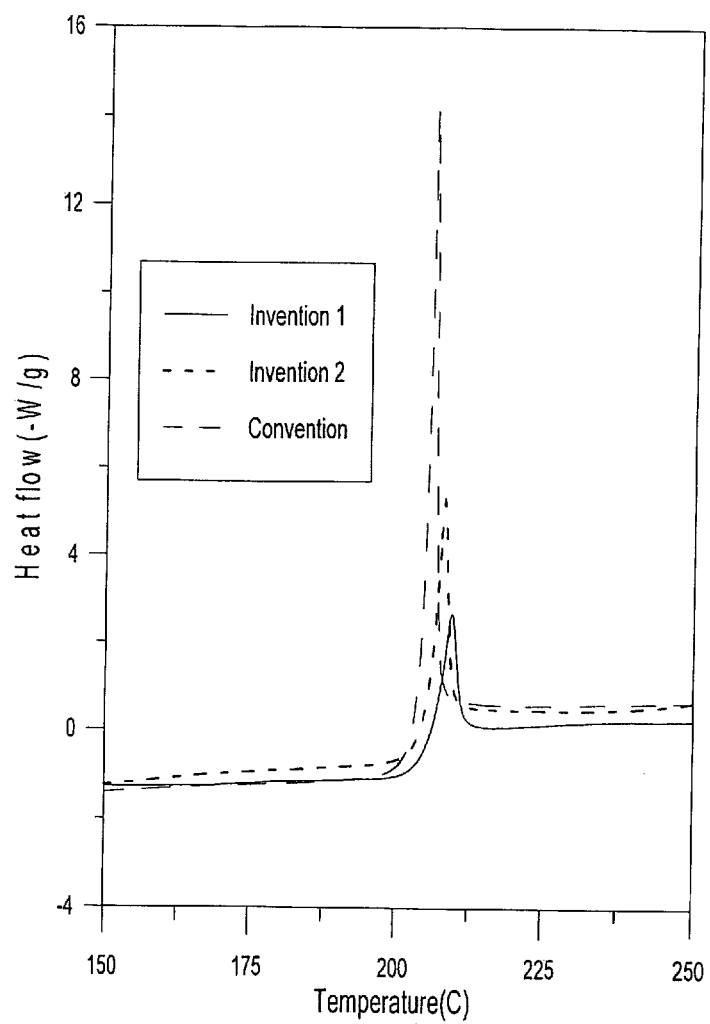
FIG. 6 is another comparison diagram tested by a differential scanning calorimeter with regard to released heat-flow of the material.

Additionally, FIG. 6 shows further experimental embodiment that still has less exothermic heat than the one of the conventional cathode material. Wherein, the cathode material uses strontium hydroxide as surface improving agent.

With regard to the crushing safety test and the drilling safety test, the prismatic battery of the conventional cathode material failed to pass the tests because of generated sparks, smoke and even explosion. The prismatic battery of the cathode material of the present invention had neither sparks nor smoke generated in the tests and had a maximum surface temperature of only about 100° C. The test results of prismatic batteries are listed as the following table 1:

TABLE 1

| | The test results of prismatic batteries | | | |
|---|---|---|---|---|
| | Discharging temperature (° C.) | Exothermic heat (J/g) | Crushing safety test | Drilling safety test |
| Convention | 206 | Over 350 | Fail Max temperature: over 300° C. | Fail Max temperature: over 300° C. |
| Invention | 208 | Less than 100 | Pass Max temperature: 100° C. | Pass Max temperature: 90° C. |

Additionally, the method in accordance with the invention can be applied to various cathode materials such as lithium-cobalt oxide ($Li_xCoO_2$), lithium manganese oxide ($Li_xMn_yO_4$), lithium-cobalt-nickel oxide ($Li_xCo_yNi_{1-y}O_2$), or those oxides further containing other metals to generate a proper nano-metal oxide layer on the surface of each particle to improve the safety of the lithium batteries.

Although the invention has been explained in relation to its preferred embodiment, many other possible modifications and variations can be made without departing from the spirit and scope of the invention as hereinafter claimed.

What is claimed is:

1. A cathode material particle comprising a plurality of cathode material cores and each cathode material core having plurality of grains and each grain being uniformly covered with a nano-metal oxide layer, wherein a thickness of the nano-metal oxide layer is from 1 nm to 100 nm.

2. The cathode material particle as claimed in claim 1, wherein the nano-metal oxide layer contains magnesium.

3. The cathode material particle as claimed in claim 1, wherein the nano-metal oxide layer contains strontium.

4. The cathode material particle as claimed in claim 1, wherein the nano-metal oxide layer contains manganese.

5. The cathode material particle as claimed in claim 1, wherein the nano-metal oxide layer contains titanium.

6. The cathode material particle as claimed in claim 1, wherein the nano-metal oxide layer contains aluminum.

7. The cathode material particle as claimed in claim 1, wherein the nano-metal oxide layer contains gallium.

8. The cathode material particle as claimed in claim 1, wherein a particle size of the cathode material particle is from about 1 μm to 20 μm.

9. The cathode material particle as claimed in claim 1, wherein a particle size of each cathode material core is from about 100 nm to 2 μm.

10. The cathode material particle as claimed in claim 1, wherein a grain size of the grain is from about 10 nm to 300 nm.

11. The cathode material particle as claimed in claim 1, wherein the cathode material core is made of material selected from the group consisting of lithium-cobalt-nickel oxide, lithium-cobalt oxide and lithium-manganese oxide.

12. The cathode material particle as claimed in claim 11, wherein the nano-metal oxide layer contains magnesium.

13. The cathode material particle as claimed in claim 11, wherein the nano-metal oxide layer contains strontium.

14. The cathode material particle as claimed in claim 11, wherein the nano-metal oxide layer contains manganese.

15. The cathode material particle as claimed in claim 11, wherein the nano-metal oxide layer contains titanium.

16. The cathode material particle as claimed in claim 11, wherein the nano-metal oxide layer contains aluminum.

17. The cathode material particle as claimed in claim 11, wherein the nano-metal oxide layer contains gallium.

* * * * *